United States Patent
Takeuchi et al.

(10) Patent No.: US 11,813,984 B2
(45) Date of Patent: Nov. 14, 2023

(54) ALIGHTING SUPPORT DEVICE

(71) Applicant: TOYOTA JIDOSHA KABUSHIKI KAISHA, Toyota (JP)

(72) Inventors: Koji Takeuchi, Toyota (JP); Noriyuki Saitoh, Nisshin (JP); Iwao Izumikawa, Toyota (JP); Junya Fukuta, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 17/358,488

(22) Filed: Jun. 25, 2021

(65) Prior Publication Data

US 2022/0080886 A1     Mar. 17, 2022

(30) Foreign Application Priority Data

Sep. 15, 2020   (JP) .................... 2020-154367

(51) Int. Cl.
*B60Q 9/00* (2006.01)
*B60R 21/01* (2006.01)
*G08G 1/16* (2006.01)

(52) U.S. Cl.
CPC .......... *B60Q 9/008* (2013.01); *B60R 21/01* (2013.01); *G08G 1/166* (2013.01); *G08G 1/167* (2013.01); *B60R 2021/01197* (2013.01); *B60R 2225/00* (2013.01)

(58) Field of Classification Search
None
See application file for complete search history.

(56) References Cited

U.S. PATENT DOCUMENTS

| | | | | |
|---|---|---|---|---|
| 4,965,546 A | * | 10/1990 | Chang ............. | B60Q 1/324 340/471 |
| 7,192,172 B1 | * | 3/2007 | Alberti ............ | B60Q 1/323 362/543 |
| 9,511,730 B1 | * | 12/2016 | Wu ................. | G06V 20/597 |
| 10,060,170 B2 | * | 8/2018 | Gómez ............. | B60J 5/0493 |
| 10,223,915 B2 | * | 3/2019 | Haines ............. | B60Q 1/324 |
| 2005/0270177 A1 | * | 12/2005 | Mori ............... | B60T 7/12 340/932.2 |

(Continued)

FOREIGN PATENT DOCUMENTS

| | | |
|---|---|---|
| CN | 107963019 A | 4/2018 |
| JP | 2018-008576 A | 1/2018 |

*Primary Examiner* — Muhammad Adnan
(74) *Attorney, Agent, or Firm* — Sughrue Mion, PLLC

(57) ABSTRACT

An alighting support device performs warning to notify a vehicle occupant of presence of a moving body having a possibility to come into contact with a right door or a left door of the vehicle. The alighting support device performs the warning when a warning condition is satisfied. When the right door or the left door is opened or is about to be opened while the moving body is moving in a right warning area set on the right side of the vehicle or a left warning area set on the left side of the vehicle, the alighting support device determines that the warning condition is satisfied. When the moving body enters the right warning area or the left warning area with the right door or the left door being open to a predetermined degree or more, the alighting support device determines that the warning condition is not satisfied.

3 Claims, 9 Drawing Sheets

(56) References Cited

U.S. PATENT DOCUMENTS

| | | | |
|---|---|---|---|
| 2006/0254142 A1* | 11/2006 | Das | B60R 21/013 49/26 |
| 2012/0053793 A1* | 3/2012 | Sala | B60N 2/0244 701/45 |
| 2012/0065858 A1* | 3/2012 | Nickolaou | B60Q 9/008 701/1 |
| 2013/0088578 A1* | 4/2013 | Umezawa | G08G 1/166 348/47 |
| 2016/0300473 A1* | 10/2016 | Chen | B60Q 9/008 |
| 2018/0079356 A1* | 3/2018 | Watanabe | B60Q 1/543 |
| 2018/0361936 A1* | 12/2018 | Knuettel | B60R 1/074 |
| 2019/0039546 A1* | 2/2019 | Elangovan | G08B 21/24 |
| 2019/0100950 A1* | 4/2019 | Aravkin | G08G 1/166 |
| 2019/0299986 A1* | 10/2019 | Saito | G01S 13/931 |
| 2020/0086852 A1* | 3/2020 | Krekel | B60W 50/14 |
| 2020/0300025 A1* | 9/2020 | Suzuki | B60Q 9/00 |
| 2020/0386037 A1* | 12/2020 | Battlogg | E05F 15/40 |
| 2021/0264172 A1* | 8/2021 | Yoo | G08B 21/18 |
| 2021/0309240 A1* | 10/2021 | Kim | B60W 30/18036 |
| 2022/0080886 A1* | 3/2022 | Takeuchi | B60Q 9/00 |
| 2022/0410884 A1* | 12/2022 | Tomita | B60W 50/0098 |

* cited by examiner

FIG. 1
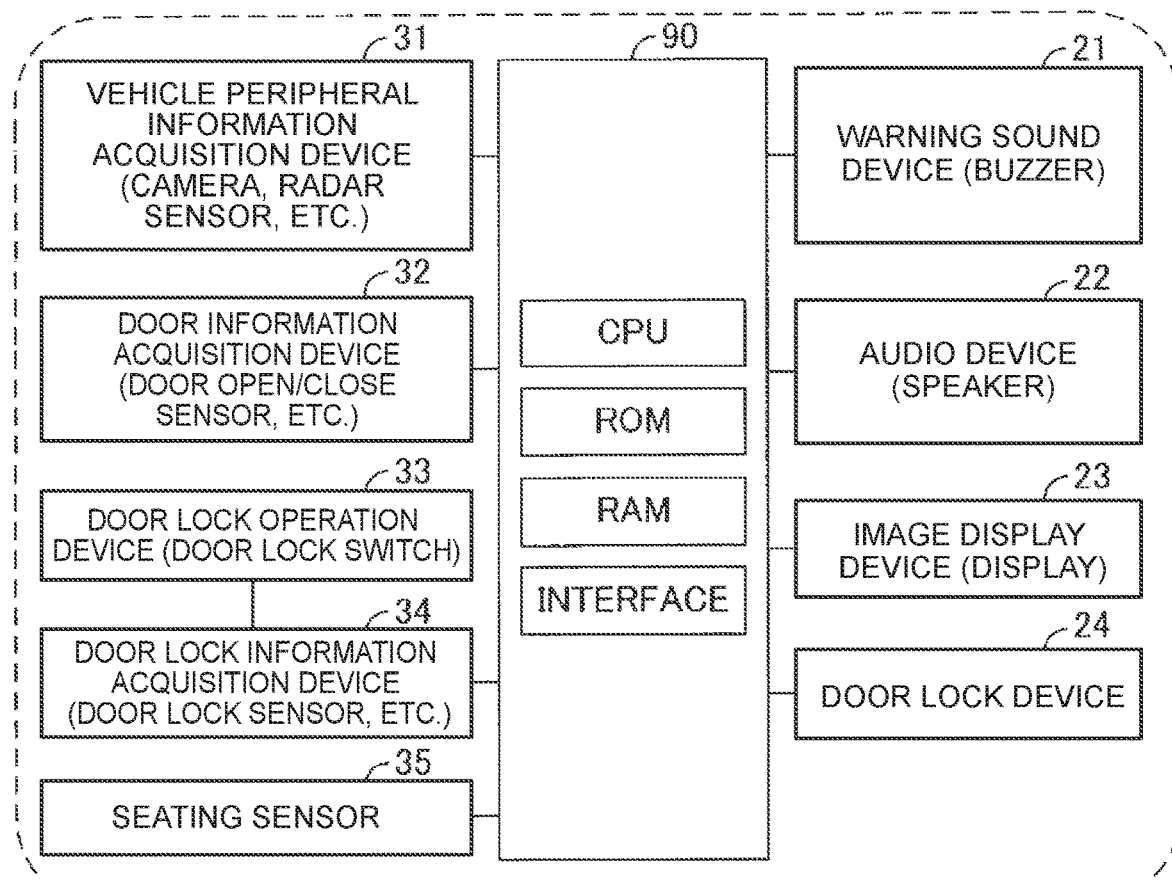
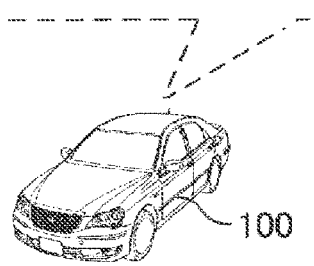
FIG. 2
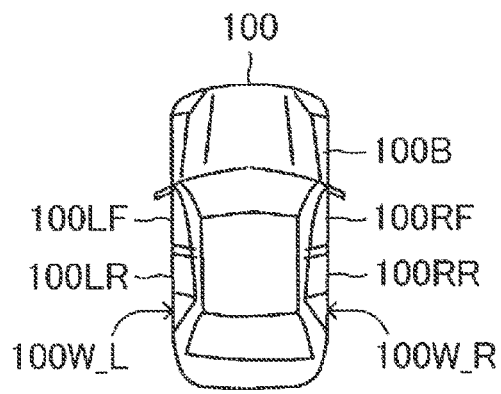

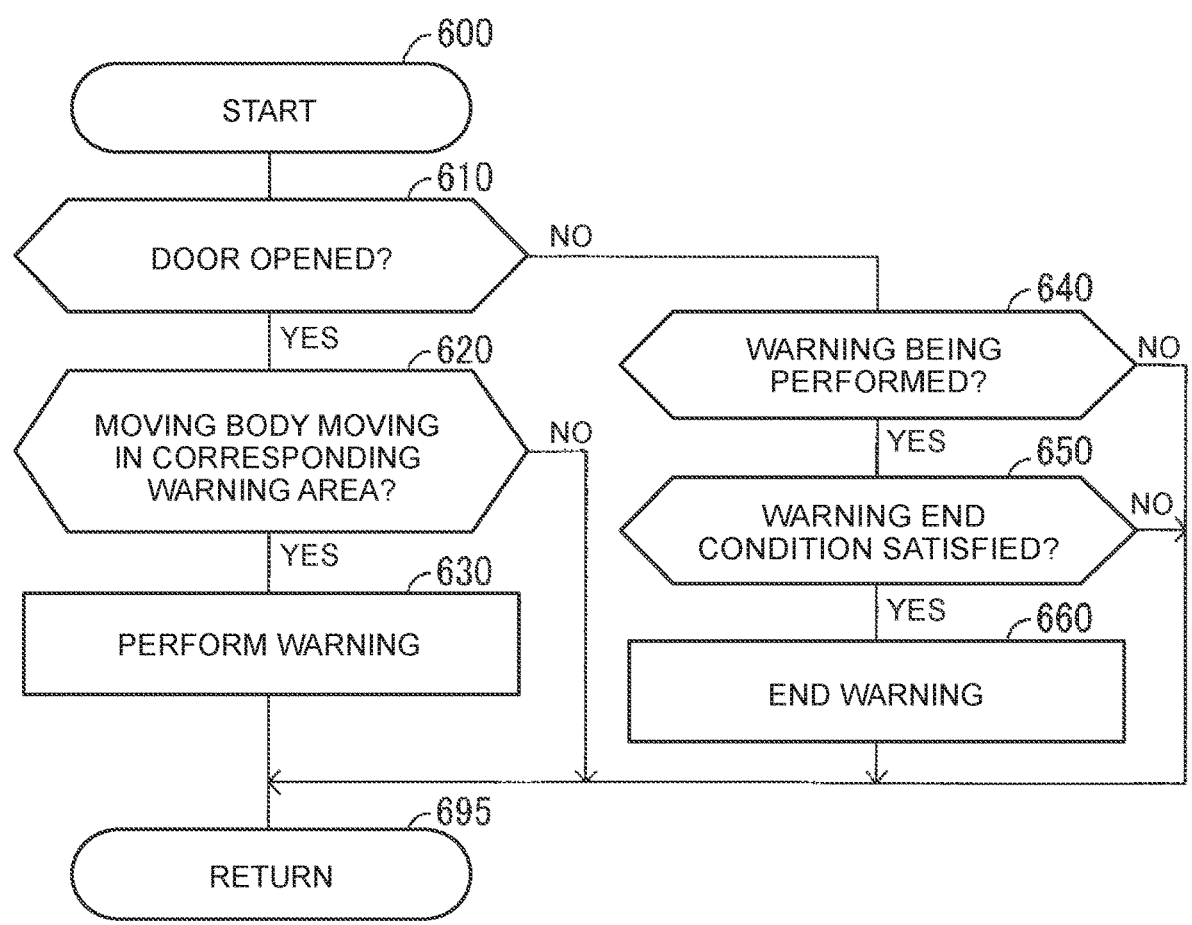

ALIGHTING SUPPORT DEVICE

CROSS-REFERENCE TO RELATED APPLICATION

This application claims priority to Japanese Patent Application No. 2020-154367 filed on Sep. 15, 2020, incorporated herein by reference in its entirety.

BACKGROUND

1. Technical Field

The present disclosure relates to an alighting support device.

2. Description of Related Art

An alighting support device is known that performs warning to notify an occupant of a vehicle that a moving body such as a motorcycle approaching the vehicle may come into contact with an opened door of the vehicle when the moving body is passing by the vehicle (see, for example, Japanese Unexamined Patent Application Publication No. 2018-8576 (JP 2018-8576 A)). The alighting support device of the related art is designed to perform warning even when the moving body approaches the door that is already open.

SUMMARY

However, for example, when the moving body is a motorcycle and the door is already open before the motorcycle approaches the door, the driver of the motorcycle is likely to recognize the door before the motorcycle comes close to the door. If the driver is aware of the door, the driver is likely to steer the motorcycle to avoid contact with the door, even when the motorcycle comes close to the door. Therefore, when the motorcycle comes close to the door with the door being already open, there is little need to perform warning. If warning is performed, the warning is useless, and in addition, the occupant of the vehicle may feel uncomfortable.

The present disclosure has been made to cope with the above issue. That is, one object of the present disclosure is to provide an alighting support device that performs warning only when there is a high possibility that the moving body comes into contact with the door of the vehicle.

A first alighting support device according to the present disclosure includes a control unit that performs warning to notify an occupant of a vehicle of presence of a moving body approaching the vehicle and having a possibility to come into contact with a right door or a left door of the vehicle.

The control unit is configured such that: when the control unit determines that a predetermined warning condition is satisfied, the control unit performs the warning; and when the control unit determines that the warning condition is not satisfied, the control unit does not perform the warning.

When the right door is opened or is about to be opened while the moving body is moving in a right warning area extending on a right side of the vehicle along a front-rear direction of the vehicle in a vicinity of the vehicle, the control unit determines that the warning condition is satisfied, and when the moving body enters the right warning area with the right door being open to a degree that is equal to or more than a predetermined degree set for the right door, the control unit determines that the warning condition is not satisfied.

When the left door is opened or is about to be opened while the moving body is moving in a left warning area extending on a left side of the vehicle along the front-rear direction of the vehicle in the vicinity of the vehicle, the control unit determines that the warning condition is satisfied, and when the moving body enters the left warning area with the left door being open to a degree that is equal to or more than a predetermined degree set for the left door, the control unit determines that the warning condition is not satisfied.

The first alighting support device according to the present disclosure does not perform the warning when the right door is opened before the moving body enters the right warning area and then the moving body enters the right warning area. Similarly, the alighting support device does not perform the warning when the left door is opened before the moving body enters the left warning area and then the moving body enters the left warning area. That is, when the right door or the left door is open before the moving body enters the right warning area or the left warning area and it is easy for the moving body to avoid contact with the door, the warning is not performed. On the other hand, when the right door or the left door is opened after the moving body enters the right warning area or the left warning area and it is difficult for the moving body to avoid contact with the door, the warning is performed.

In this way, when it is easy for the moving body to avoid contact with the door and the moving body is less likely to come into contact with the door without the warning, the warning is not performed. Therefore, it is possible to suppress unnecessary warning. On the other hand, when it is difficult for the moving body to avoid contact with the door and the moving body is likely to come into contact with the door, the warning is performed. Therefore, the warning can be performed only when there is a high possibility that the moving body comes into contact with the door of the vehicle.

A second alighting support device according to the present disclosure also includes a control unit that performs warning to notify an occupant of a vehicle of presence of a moving body approaching the vehicle and having a possibility to come into contact with a right door or a left door of the vehicle.

When a predetermined first warning condition is satisfied, the control unit performs warning in a first mode in which a warning level is a predetermined level, the warning level being a level of possibility that causes the occupant to notice the presence of the moving body having a possibility to come into contact with the right door or the left door, and when a predetermined second warning condition different from the first warning condition is satisfied, the control unit performs warning in a second mode in which the warning level is lower than the predetermined level.

When the right door is opened or is about to be opened while the moving body is moving in a right warning area extending on a right side of the vehicle along a front-rear direction of the vehicle in a vicinity of the vehicle, the control unit determines that the first warning condition is satisfied, and when the moving body enters the right warning area with the right door being open to a degree that is equal to or more than a predetermined degree set for the right door, the control unit determines that the second warning condition is satisfied.

When the left door is opened or is about to be opened while the moving body is moving in a left warning area extending on a left side of the vehicle along the front-rear direction of the vehicle in the vicinity of the vehicle, the control unit determines that the first warning condition is satisfied, and when the moving body enters the left warning area with the left door being open to a degree that is equal to or more than a predetermined degree set for the left door, the control unit determines that the second warning condition is satisfied.

The second alighting support device according to the present disclosure performs the warning in the second mode in which the warning level is lower when the right door or the left door is opened before the moving body enters the right warning area or the left warning area and then the moving body enters the right warning area or the left warning area. That is, when the right door or the left door is open before the moving body enters the right warning area or the left warning area and it is easy for the moving body to avoid contact with the door, the warning with a lower warning level is performed. On the other hand, when the right door or the left door is opened after the moving body enters the right warning area or the left warning area and it is difficult for the moving body to avoid contact with the door, the warning in the first mode in which the warning level is higher is performed.

In this way, the warning with higher warning level is performed when it is difficult for the moving body to avoid contact with the door than when it is easy for the moving body to avoid contact with the door. Therefore, it is possible to increase the possibility that the occupant can notice the presence of the moving body having a possibility to come into contact with the door when it is difficult for the moving body 200 to avoid contact with the door. Thus, it is possible to suppress unnecessary warning. Therefore, the warning can be performed only when there is a high possibility that the moving body comes into contact with the door of the vehicle.

The second alighting support device according to the present disclosure may include a plurality of warning units that performs warning to notify the occupant of the vehicle of the presence of the moving body having a possibility to come into contact with the right door or the left door of the vehicle. In this case, the warning in the first mode may be warning using all of the warning units, and the warning in the second mode may be warning using part of the warning units. According to this, by changing the number of units that perform the warning, it is possible to perform different levels of warning.

Further, the predetermined degree set for the right door is set to a degree larger than zero, for example, and the predetermined degree set for the left door is set to a degree larger than zero, for example. According to this, when the right door or the left door that was open small while the moving body is moving in the right warning area or the left warning area toward the right door or the left door is opened, the warning is performed. Therefore, even when the right door or the left door that was open small is opened and it is difficult for the moving body to avoid contact with the door, the warning can be performed.

Further, the predetermined degree set for the right door is set to zero, for example, and the predetermined degree set for the left door is set to zero, for example. According to this, it is possible to perform the warning only when the right door or the left door that was closed while the moving body is moving in the right warning area or the left warning area toward the right door or the left door is opened.

The right warning area includes a right rear warning area extending rearward of the vehicle on the right side of the vehicle in the vicinity of the vehicle, for example. The left warning area includes a left rear warning area extending rearward of the vehicle on the left side of the vehicle in the vicinity of the vehicle, for example. According to this, it is possible to perform the warning to the moving body approaching the vehicle from the rear.

The right warning area includes a right front warning area extending forward of the vehicle on the right side of the vehicle in the vicinity of the vehicle, for example. The left warning area includes a left front warning area extending forward of the vehicle on the left side of the vehicle in the vicinity of the vehicle, for example. According to this, it is possible to perform the warning to the moving body approaching the vehicle from the front.

The components of the present disclosure are not limited to the embodiments of the present disclosure described later with reference to the drawings. Other objects, other features, and accompanied advantages of the present disclosure will be easily understood from the description on embodiments of the present disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram showing an alighting support device according to an embodiment of the present disclosure and a vehicle to which the alighting support device is applied;

FIG. 2 is a diagram showing the vehicle to which the alighting support device according to the embodiment of the present disclosure is applied;

FIG. 6 is a flowchart showing a routine executed by the alighting support device according to a first embodiment of the present disclosure;

DETAILED DESCRIPTION OF EMBODIMENTS

Figure 3:
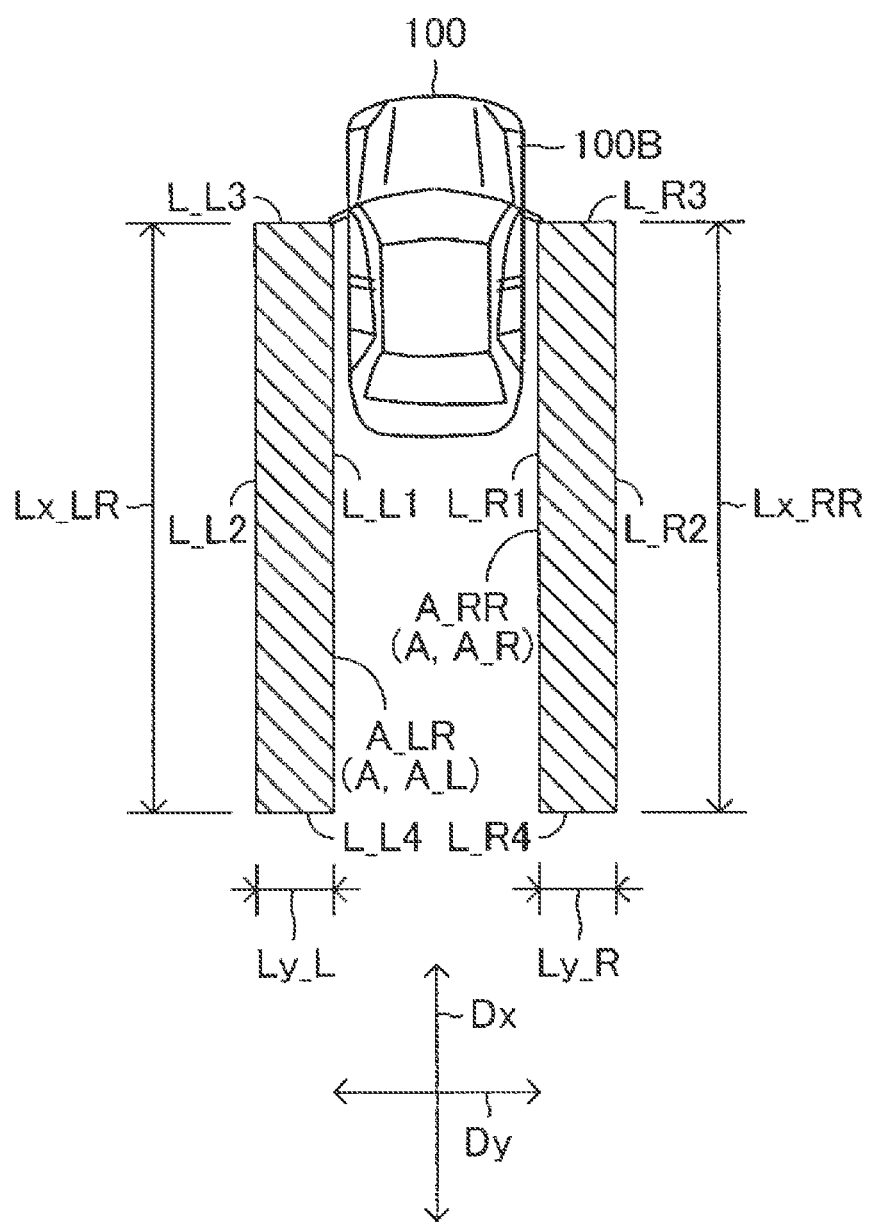
FIG. 3 is a diagram showing warning areas in the alighting support device according to the embodiment of the present disclosure.

Hereinafter, an alighting support device according to an embodiment of the present disclosure will be described with reference to the drawings. FIG. 1 shows an alighting support device 10 according to the embodiment of the present disclosure. The alighting support device 10 is mounted on an own vehicle 100.

As shown in FIG. 2, in the present example, the own vehicle 100 includes four doors 100D. The doors 100D include a door provided at the right front of the own vehicle 100 (hereinafter, "right front door 100RF"), a door provided at the right rear of the own vehicle 100 (hereinafter, "right rear door 100RR"), a door provided at the left front of the own vehicle 100 (hereinafter "left front door 100LF"), and a door provided at the left rear of the own vehicle 100 (hereinafter "left rear door 100LR").

In the present example, each door 100D is a swing door (that is, a pivot door). Therefore, each door 100D is attached to a vehicle body 100B of the own vehicle 100 so as to be swingable (that is, pivotable) around the pivot axis extending vertically at the front part thereof. An occupant of the own vehicle 100 can cause the right front door 100RF and the right rear door 100RR in the closed state to pivot counterclockwise outward (that is, in the direction away from the vehicle body 100B) around their respective pivot axes, so as to open the right front door 100RF and the right rear door 100RR. On the contrary, the occupant of the own vehicle 100 can cause the right front door 100RF and the right rear door 100RR in the open state to pivot clockwise inward (that is, in the direction toward the vehicle body 100B) around their respective pivot axes, so as to close the right front door 100RF and the right rear door 100RR. Similarly, the occupant of the own vehicle 100 can cause the left front door 100LF and the left rear door 100LR in the closed state to pivot clockwise outward (that is, in the direction away from the vehicle body 100B) around their respective pivot axes, so as to open the left front door 100LF and the left rear door 100LR. On the contrary, the occupant of the own vehicle 100 can cause the left front door 100LF and the left rear door 100LR in the open state to pivot counterclockwise inward (that is, in the direction toward the vehicle body 100B) around their respective pivot axes, so as to close the left front door 100LF and the left rear door 100LR.

It should be noted that one or more of the doors 100D may be sliding doors. For example, when the right rear door 100RR is a sliding door, the right rear door 100RR is attached to the vehicle body 100B so as to be slidable in the front-rear direction Dx of the own vehicle 100. The occupant of the own vehicle 100 can open the right rear door 100RR in the closed state by sliding the right rear door 100RR rearward, and conversely, can close the right rear door 100RR in the open state by sliding the right rear door 100RR forward. Also, when the left rear door 100LR is a sliding door, the left rear door 100LR is attached to the vehicle body 100B so as to be slidable in the front-rear direction Dx of the own vehicle 100. The occupant of the own vehicle 100 can open the left rear door 100LR in the closed state by sliding the left rear door 100LR rearward, and conversely, can close the left rear door 100LR in the open state by sliding the left rear door 100LR forward.

Hereinafter, each of the right front door 100RF and the right rear door 100RR will be referred to as "right door 100R", and each of the left front door 100LF and the left rear door 100LR will be referred to as "left door 100L".

ECU

The alighting support device 10 includes an ECU 90. The ECU is an abbreviation for electronic control unit. The ECU 90 includes a microcomputer as a main part. The microcomputer includes a central processing unit (CPU), a read only memory (ROM) a random access memory (RAM), a non-volatile memory, an interface, and the like. The CPU realizes various functions by executing instructions, programs, or routines stored in the ROM.

Warning Sound Device, etc.

The own vehicle 100 is equipped with a warning sound device 21, an audio device 22, an image display device 23, and a door lock device 24.

Warning Sound Device

The warning sound device 21 is, for example, a buzzer capable of generating various warning sounds. The warning sound device 21 is electrically connected to the ECU 90. The ECU 90 can control the generation of the warning sound from the warning sound device 21.

Audio Device

The audio device 22 is, for example, a speaker capable of issuing an announcement by a human voice. The audio device 22 is electrically connected to the ECU 90. The ECU 90 can control the generation of the announcement from the audio device 22.

Image Display Device

The image display device 23 is, for example, a display capable of displaying various images. The image display device 23 is electrically connected to the ECU 90. The ECU 90 can control the display of an image on the image display device 23.

Door Lock Device

The door lock device 24 is a device for locking each door 100D and unlocking each door 100D. The door lock device 24 is electrically connected to the ECU 90. The ECU 90 can control the operation of the door lock device 24.

Vehicle Peripheral Information Acquisition Device, Etc.

Further, the own vehicle 100 is equipped with a vehicle peripheral information acquisition device 31, a door information acquisition device 32, a door lock operation device 33, a door lock information acquisition device 34, and a seating sensor 35.

Vehicle Peripheral Information Acquisition Device

The vehicle peripheral information acquisition device 31 is, for example, a camera, a radar, a laser radar, or an ultrasonic sensor. The vehicle peripheral information acquisition device 31 is electrically connected to the ECU 90. The vehicle peripheral information acquisition device 31 is mounted on the own vehicle 100 so as to acquire information on the situation in predetermined ranges rearward and forward of the own vehicle 100. The vehicle peripheral information acquisition device 31 acquires the information on the situation in the predetermined ranges rearward and forward of the own vehicle 100, and transmits the acquired information to the ECU 90. Based on the information, the ECU 90 acquires information on the situation rearward and forward of the own vehicle 100, particularly information on the moving body 200 approaching the own vehicle 100 from the rear and the front, as peripheral information Isur.

In the present example, the moving body 200 is another vehicle, a motorcycle, a bicycle and a pedestrian. In the following description, drivers of other vehicles, motorcycles and bicycles will be each referred to as "driver of the moving body 200".

When the vehicle peripheral information acquisition device 31 is a camera, for example, the vehicle peripheral information acquisition device 31 is mounted on the own vehicle 100 so as to image the predetermined ranges rearward and forward of the own vehicle 100. The vehicle peripheral information acquisition device 31 captures the predetermined ranges rearward and forward of the own vehicle 100 so as to acquire the images of the predetermined ranges rearward and forward of the own vehicle 100, and transmits the information on the images to the ECU 90. Based on the information on the images, the ECU 90 acquires the information on the situation rearward and forward of the own vehicle 100, particularly the information on the moving body 200 approaching the own vehicle 100 from the rear and the front, as the peripheral information Isur.

When the vehicle peripheral information acquisition device 31 is a radar, the vehicle peripheral information acquisition device 31 is mounted on the own vehicle 100 so that radio waves can be transmitted to the predetermined ranges rearward and forward of the own vehicle 100. When there is an object in the predetermined ranges rearward and forward of the own vehicle 100, the radio waves transmitted from the vehicle peripheral information acquisition device 31 are reflected by the object. The reflected radio waves arrive at the vehicle peripheral information acquisition device 31. The vehicle peripheral information acquisition device 31 receives the arriving radio waves. The vehicle peripheral information acquisition device 31 acquires, as the peripheral information Isur, information on the position, the moving direction, the moving speed, and the like of the object in the predetermined ranges rearward and forward of the own vehicle 100 based on the information on the transmitted radio waves and the information on the received radio waves, particularly, information on the moving body 200 approaching the own vehicle 100 from the rear and the front.

Door Information Acquisition Device

The door information acquisition device 32 is, for example, a door sensor that detects whether each door 100D is closed, a door angle sensor that detects the angle (pivot angle θswing) by which the door 100D pivots from the closed position when the door 100D is a swing door, or a door distance sensor that detects a distance (sliding distance Lslide) by which the door 100D is slid from the closed position when the door 100D is a sliding door.

The door information acquisition device 32 is electrically connected to the ECU 90. The door information acquisition device 32 detects whether each door 100D is closed, the pivot angle θswing of each door 100D, or the sliding distance Lslide of each door 100D, and transmits information on the detection results to the ECU 90. Based on the information, the ECU 90 can acquire, as door information Idoor, whether each door 100D is closed or open, the pivot angle θswing of each door 100D, or the sliding distance Lslide of each door 100D.

Door Lock Operation Device

The door lock operation device 33 is, for example, a door lock switch operated by the occupant of the own vehicle 100. Further, the door lock information acquisition device 34 is, for example, a door lock sensor that detects an operation applied to the door lock operation device 33.

The door lock operation device 33 is electrically connected to the door lock information acquisition device 34. The door lock information acquisition device 34 is electrically connected to the ECU 90. The door lock information acquisition device 34 detects the operation applied to the door lock operation device 33, and transmits information regarding the detected operation to the ECU 90. The ECU 90 locks and unlocks the door 100D by operating the door lock device 24 in accordance with the information. Thus, the occupant of the own vehicle 100 can lock and unlock each door 100D with the door lock device 24 by operating the door lock operation device 33.

Seating Sensor

The seating sensor 35 is electrically connected to the ECU 90. When the occupant is sitting in the seat of the own vehicle 100, the seating sensor 35 detects the position of the seat in which the occupant is sitting and transmits information on the detected position to the ECU 90. The ECU 90 can identify the seat in which the occupant is sitting based on the information. Therefore, the ECU 90 can determine whether the occupant has opened the door 100D in order to get off the own vehicle 100 or a person has opened the door 100D in order to get on the own vehicle 100, based on which seat the occupant is sitting in when the door 100D is opened. Also, the ECU 90 can determine whether the occupant has unlocked the door 100D in order to get off the own vehicle 100 or a person has unlocked the door 100D in order to get on the own vehicle 100, based on which seat the occupant is sitting in when the door 100D is unlocked.

Outline of Operations of Alighting Support Device According to First Embodiment

Next, the outline of the operations of the alighting support device 10 according to the first embodiment will be described.

Warning Area

As shown in FIG. 3, a warning areas A is set in advance. The warning area A includes an area on the right side of the own vehicle 100 (right warning area A_R or right rear warning area A_RR) and an area on the left side of the own vehicle 100 (left warning area A_L or left rear warning area A_LR).

Right Rear Warning Area

The right rear warning area A_RR of the own vehicle 100 is an area defined by a right side wall surface line L_R1, a right side line L_R2, a right front door line L_R3, and a right rear line L_R4.

The right side wall surface line L_R1 is a line extending in the front-rear direction Dx of the own vehicle 100 along a right side wall surface 100W R of the own vehicle 100. The right side line L_R2 is a line extending in the front-rear direction Dx of the own vehicle 100 in parallel with the right side wall surface line L_R1 and spaced away to the right from the right side wall surface line L_R1 by a predetermined distance (predetermined right side width Ly_R). The right front door line L_R3 is a line extending in the lateral direction Dy of the own vehicle 100 through the front end portion of the right front door 100RF. The right rear line L_R4 is a line extending in the lateral direction Dy of the own vehicle 100 in parallel with the right front door line L_R3 and spaced away to the rear from the right front door line L_R3 by a predetermined distance (predetermined right rear length Lx_RR).

In the present example, in the case where at least one of the right doors 100R is a swing door, the predetermined right side width Ly_R is set to a length that the moving body 200 does not come into contact with the right door 100R when the pivot angle θswing reaches the maximum angle θswing_max. However, the predetermined right side width Ly_R may be set to a length longer than that length, or may be set to a length shorter than that length.

When both of the right doors 100R are sliding doors, the predetermined right side width Ly_R is set to a length that the moving body 200 does not come into contact with the occupant immediately after getting off through the opened right door 100R. However, the predetermined right side width Ly_R may be set to a length longer than that length, or may be set to a length shorter than that length.

Further, in the present example, the predetermined right rear length Lx_RR is set to a minimum required length required for the moving body 200 moving in the right rear warning area A_RR toward the right door 100R in the open state to exit the right rear warning area A_RR in order to avoid the right door 100R. Therefore, in the present example, the predetermined right rear length Lx_RR is set to be longer as the moving speed V2 of the moving body 200 is higher. The predetermined right rear length Lx_RR may be set to a length longer than the minimum required length, or may be set to a length shorter than the minimum required length in some cases. Also in these cases, the predetermined right rear length Lx_RR is set in accordance with the moving speed V2 of the moving body 200. However, the predetermined right rear length Lx_RR may be set to a fixed distance.

In the present example, one right rear warning area A_RR is set common to the right front door 100RF and the right rear door 100RR. However, the right rear warning area A_RR may be set individually to the right front door 100RF and the right rear door 100RR.

Left Rear Warning Area

The left rear warning area A_LR of the own vehicle 100 is an area defined by a left side wall surface line L_L1, a left side line L_L2, a left front door line L_L3, and a left rear line L_L4.

The left side wall surface line L_L1 is a line extending in the front-rear direction Dx of the own vehicle 100 along a left side wall surface 100W_L of the own vehicle 100. The left side line L_L2 is a line extending in the front-rear direction Dx of the own vehicle 100 in parallel with the left side wall surface line L_L1 and spaced away to the left from the left side wall surface line L_L1 by a predetermined distance (predetermined left side width Ly_L). The left front door line L_L3 is a line extending in the lateral direction Dy of the own vehicle 100 through the front end portion of the left front door 100LF. The left rear line L_L4 is a line extending in the lateral direction Dy of the own vehicle 100 in parallel with the left front door line L_L3 and spaced away to the rear from the left front door line L_L3 by a predetermined distance (predetermined left rear length Lx_LR).

In the present example, in the case where at least one of the left doors 100L is a swing door, the predetermined left side width Ly_L is set to a length that the moving body 200 does not come into contact with the left door 100L when the pivot angle θswing reaches the maximum angle θswing_max. However, the predetermined left side width Ly_L may be set to a length longer than that length, or may be set to a length shorter than that length.

When both of the left doors 100L are sliding doors, the predetermined left side width Ly_L is set to a length that the moving body 200 does not come into contact with the occupant immediately after getting off through the opened left door 100L. However, the predetermined left side width Ly_L may be set to a length longer than that length, or may be set to a length shorter than that length.

Further, in the present example, the predetermined left rear length Lx_LR is set to a minimum required length required for the moving body 200 moving in the left rear warning area A_LR toward the left door 100L in the open state to exit the left rear warning area A_LR in order to avoid the left door 100L. Therefore, in the present example, the predetermined left rear length Lx_LR is set to be longer as the moving speed V2 of the moving body 200 is higher. The predetermined left rear length Lx_LR may be set to a length longer than the minimum required length, or may be set to a length shorter than the minimum required length in some cases. Also in these cases, the predetermined left rear length Lx_LR is set in accordance with the moving speed V2 of the moving body 200. However, the predetermined left rear length Lx_LR may be set to a fixed distance.

In the present example, the predetermined right side width Ly_R and the predetermined left side width Ly_L have equal lengths, and the predetermined right rear length Lx_RR and the predetermined left rear length Lx_LR have equal lengths.

In the present example, one left rear warning area A_LR is set common to the left front door 100LF and the left rear door 100LR. However, the left rear warning area A_LR may be set individually to the left front door 100LF and the left rear door 100LR.

Warning

The alighting support device 10 monitors whether the moving body 200 is moving in the warning area A toward the door 100D based on the peripheral information Isur, and also monitors the open/closed state of the door 100D based on the door information Idoor.

Case of Performing Warning

Figure 4A:
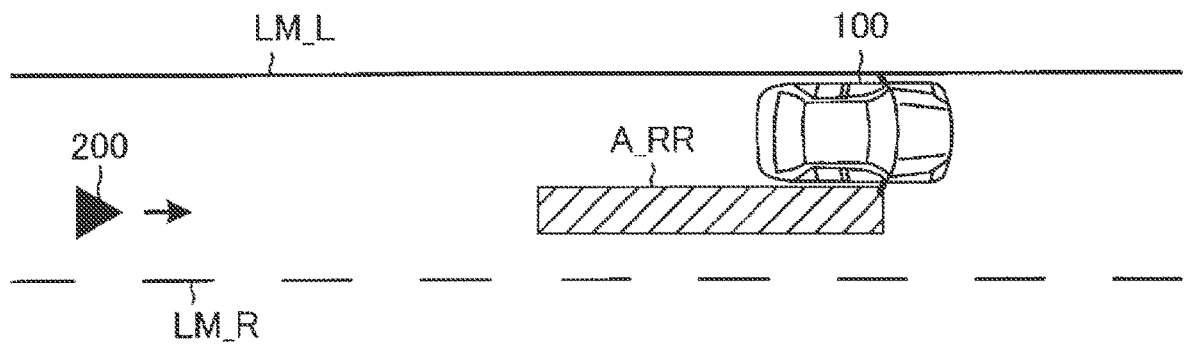
FIG. 4A is a diagram showing an example of a situation in which warning is performed.

For example, as shown in FIG. 4A, in the situation where the moving body 200 is approaching the own vehicle 100 from the rear of the own vehicle 100, the alighting support device 10 detects the moving body 200 based on the peripheral information Isur. In the drawings, reference signs LM_R and LM_L are lane markings that define the lane in which the own vehicle 100 is stopped.

Figure 4B:
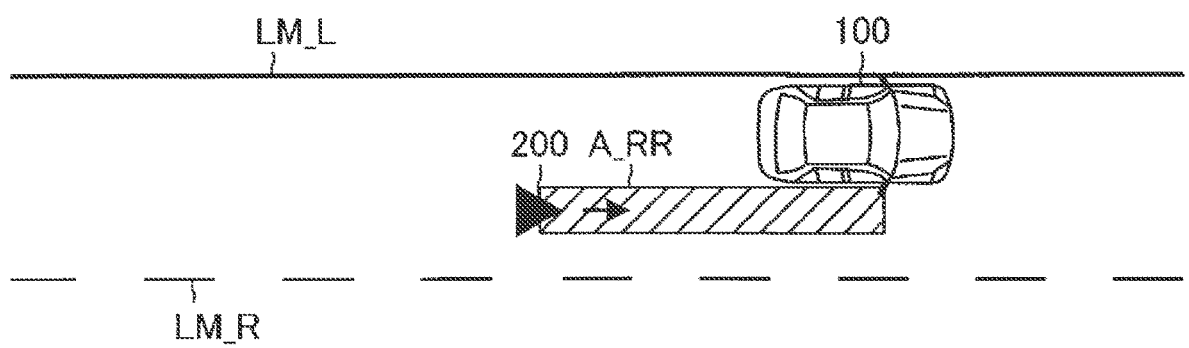
FIG. 4B is a diagram showing an example of the situation in which the warning is performed.

As shown in FIG. 4B, when the moving body 200 has entered the right rear warning area A_RR, the alighting support device 10 detects that the moving body 200 has entered the right rear warning area A_RR A based on the peripheral information Isur. In the example shown in FIG. 4B, at the timing when the moving body 200 enters the right rear warning area A_RR, both the right front door 100RF and the right rear door 100RR of the own vehicle 100 are closed. In this case, the alighting support device 10 does not determine that the warning condition Calert has been satisfied, and therefore does not perform warning.

Figure 4C:
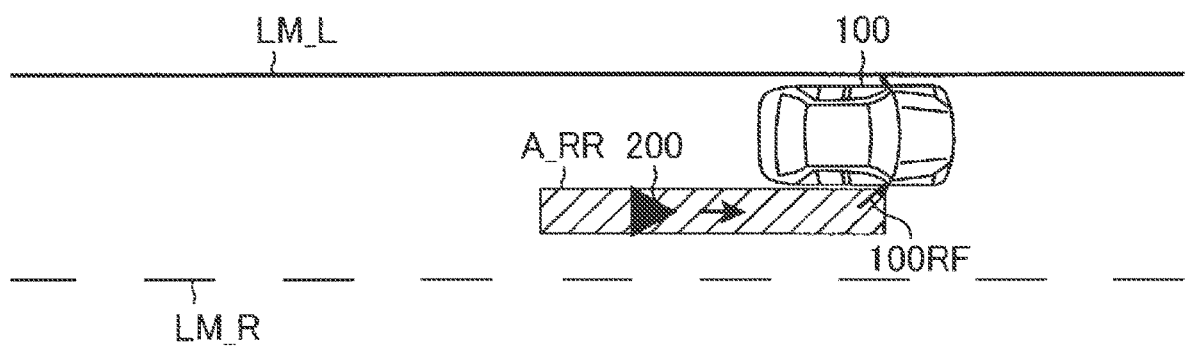
FIG. 4C is a diagram showing an example of the situation in which the warning is performed.

Thereafter, as shown in FIG. 4C, when the right front door 100RF is opened while the moving body 200 is moving in the right rear warning area A_RR toward the right front door 100RF, the alighting support device 10 determines that the warning condition Calert has been satisfied and performs the warning to the occupant of the own vehicle 100.

In the present example, the warning includes warning by generation of a warning sound from the warning sound device 21, warning by generation of a warning voice from the audio device 22, and warning by display of a warning image on the image display device 23, but may include one or two thereof. The warning voice is a voice (announcement) notifying that the moving body 200 is approaching the door 100D from the rear. The warning image is an image of text, graphics, and the like notifying that the moving body 200 is approaching the door 100D from the rear.

Thus, the occupant who is about to get off the own vehicle 100 by opening the right front door 100RF can recognize that the moving body 200 is approaching the right front door 100RF.

Similarly, when the right rear door 100RR is opened while the moving body 200 is moving in the right rear warning area A_RR toward the right doors 100R, the alighting support device 10 determines that the warning condition Calert has been satisfied and performs the warning to the occupant of the own vehicle 100.

When the left front door 100LF or the left rear door 100LR is opened while the moving body 200 is moving in the left rear warning area A_LR toward the left doors 100L, the alighting support device 10 determines that the warning condition Calert has been satisfied and performs the warning to the occupant of the own vehicle 100.

After the start of the warning, when the warning end condition Cter that the door 100D that is the target of the warning is closed or the moving body 200 that is the target of the warning has exited the warning area A, the alighting support device 10 ends the warning.

Case of not Performing Warning

On the other hand, in the situation described below, the alighting support device 10 does not perform the warning.

Figure 5A:
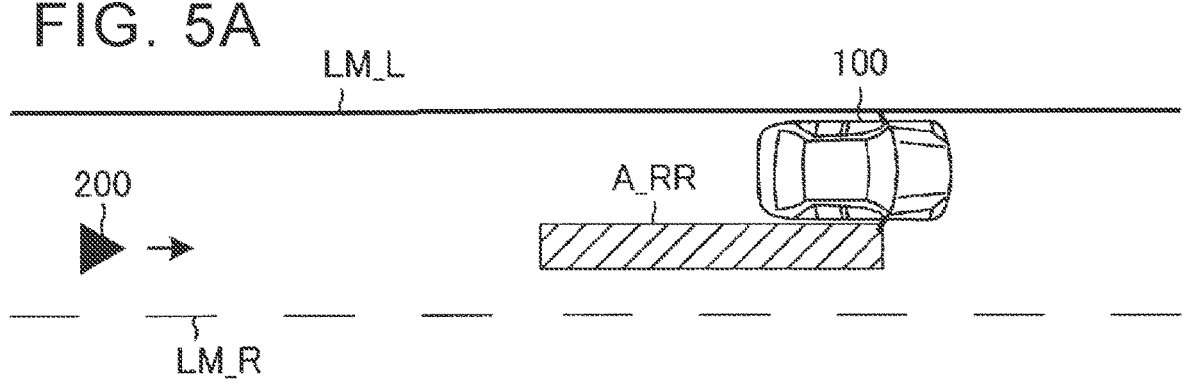
FIG. 5A is a diagram showing an example of a situation in which the warning is not performed.

For example, as shown in FIG. 5A, in the situation where the moving body 200 is approaching the own vehicle 100 from the rear of the own vehicle 100, the alighting support device 10 detects the moving body 200 based on the peripheral information Isur.

Figure 5B:
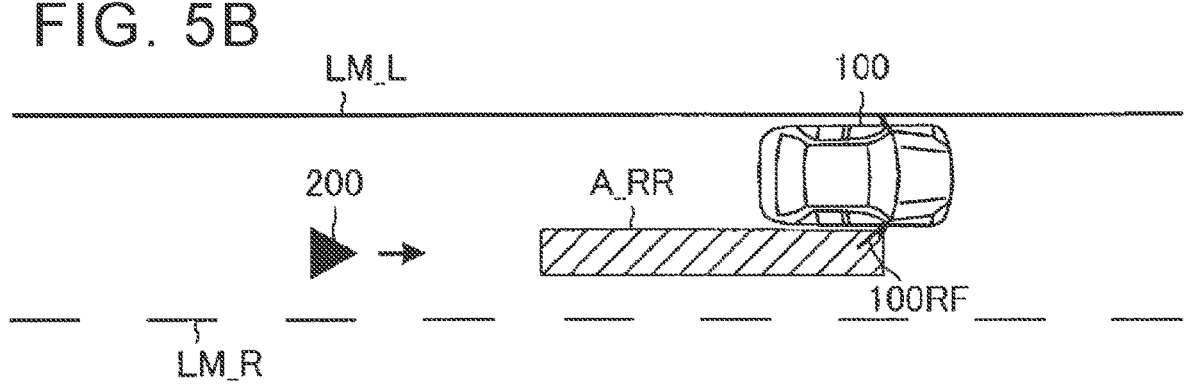
FIG. 5B is a diagram showing an example of the situation in which the warning is not performed.
Figure 5C:
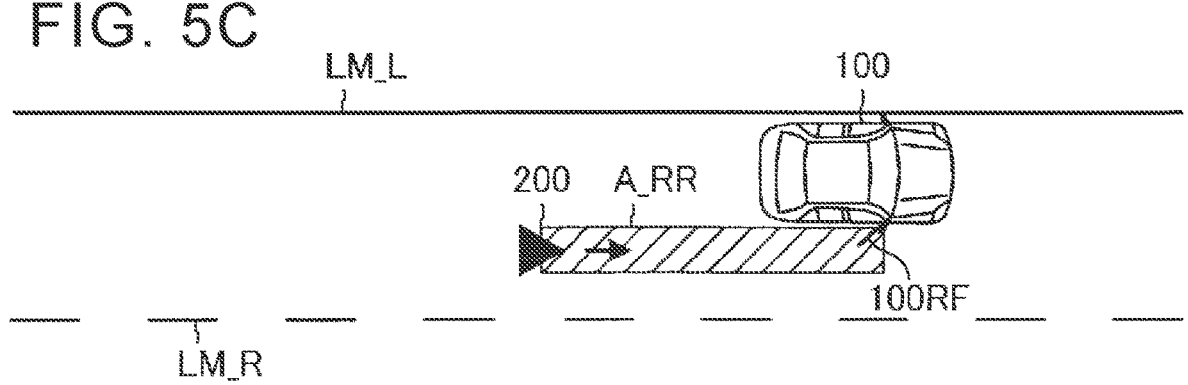
FIG. 5C is a diagram showing an example of the situation in which the warning is not performed.

When the right front door 100RF is opened before the moving body 200 enters the right rear warning area A_RR as shown in FIG. 5B, and then the moving body 200 enters the right rear warning area A_RR shown in FIG. 5C, the alighting support device 10 detects that the moving body 200 has entered the right rear warning area A_RR A but does not perform the warning. In other words, when the moving body 200 enters the right rear warning area A_RR with the right front door 100RF being already open, the alighting support device 10 does not determine that the warning condition Calert has been satisfied, and therefore, does not perform the warning.

Effects

As described above, the alighting support device 10 does not perform the warning, when the right door 100R is opened before the moving body 200 enters the right rear warning area A_RR and thereafter the moving body 200 enters the right rear warning area A_RR. Similarly, the alighting support device 10 does not perform the warning, when the left door 100L is opened before the moving body 200 enters the left rear warning area A_LR and thereafter the moving body 200 enters the left rear warning area A_LR. That is, when the door 100D is in the open state before the moving body 200 enters the warning area A and it is easy for the driver of the moving body 200 or the pedestrian to take an action to avoid contact with the door 100D, the warning is not performed.

On the other hand, when the door 100D is opened after the moving body 200 enters the warning area A and it is difficult for the driver of the moving body 200 or the pedestrian to take an action to avoid contact with the door 100D, the warning is performed.

In this way, when it is easy for the driver of the moving body 200 or the pedestrian to take an action to avoid contact with the door 100D and the moving body 200 is less likely to come into contact with the door 100D without the warning, the warning is not performed. Therefore, it is possible to suppress unnecessary warning. On the other hand, when it is difficult for the driver of the moving body 200 or the pedestrian to take an action to avoid contact with the door 100D and the moving body 200 is likely to come into contact with the door 100D, the warning is performed. Therefore, it is possible to increase the possibility that the occupant of the own vehicle 100 notices the presence of the moving body 200 having a possibility to come into contact with the door 100D. As a result, the occupant is prompted to stop the action of opening the door 100D or start the action of closing the door 100D. Thus, it is possible to restrain the moving body 200 from coming into contact with the door 100D.

Specific Operations of Alighting Support Device According to First Embodiment

Next, specific operations of the alighting support device 10 will be described. The CPU of the ECU 90 of the alighting support device 10 executes the routine shown in FIG. 6 every time a predetermined time elapses. Therefore, at a predetermined timing, the CPU starts the process from step 600 in FIG. 6, proceeds with the process to step 610, and determines whether the door 100D is opened.

When the CPU determines "Yes" in step 610, the CPU proceeds with the process to step 620, and determines whether the moving body 200 is moving in the warning area A corresponding to the opened door 100D toward the door 100D. The warning area A corresponding to the opened door 100D is the right rear warning area A_RR when the right door 100R is opened, and the left rear warning area A_LR when the left door 100L is opened.

When the CPU determines "Yes" in step 620, the CPU proceeds with the process to step 630 and performs the warning. Thereafter, the CPU proceeds with the process to step 695 and temporarily ends the routine.

On the other hand, when the CPU determines "No" in step 620, the CPU directly proceeds with the process to step 695 and temporarily ends the routine.

When the CPU determines "No" in step 610, the CPU proceeds with the process to step 640 and determines whether the warning is being performed.

When the CPU determines "Yes" in step 640, the CPU proceeds with the process to step 650, and determines whether the warning end condition Cter that the door 100D that is the target of the warning is closed or the moving body 200 that is the target of the warning has exited the warning area A is satisfied.

When the CPU determines "Yes" in step 650, the CPU proceeds with the process to step 660 and ends the warning being performed. Thereafter, the CPU proceeds with the process to step 695 and temporarily ends the routine.

On the other hand, when the CPU determines "No" in step 640 or step 650, the CPU directly proceeds with the process to step 695 and temporarily ends the routine.

The specific operations of the alighting support device 10 according to the first embodiment have been described above.

Second Embodiment

Next, the alighting support device 10 according to a second embodiment will be described.

The alighting support device 10 according to the first embodiment does not determine that the warning condition Calert has been satisfied and therefore does not perform the warning when the corresponding door 100D is already open at the timing when the moving body 200 enters the warning area A. The corresponding door 100D is the right door 100R when the moving body 200 enters the right rear warning area A_RR, and the corresponding door 100D is the left door 100L when the moving body 200 enters the left rear warning area A_LR.

However, when the moving body 200 is a motorcycle or the like, it cannot be said that there is no possibility that the driver of the moving body 200 or the pedestrian keeps moving toward the door 100D without noticing the open door 100D and comes into contact with the door 100D. Therefore, the alighting support device 10 according to the second embodiment of the present disclosure performs the warning as follows.

Outline of Operations of Alighting Support Device According to Second Embodiment The alighting support device 10 according to the second embodiment also monitors whether the moving body 200 is moving in the warning area A toward the door 100D based on the peripheral information Isur, and monitors the open/closed state of the door 100D based on the door information Idoor.

Case of Performing Warning in First Mode

In the situation where the moving body 200 is approaching the own vehicle 100 from the rear of the own vehicle 100, the alighting support device 10 detects the moving body 200 based on the peripheral information Isur.

Then, the alighting support device 10 detects that the moving body 200 has entered the right rear warning area A_RR based on the peripheral information Isur. At this time, when both right doors 100R are closed, the alighting support device 10 does not determine that the warning condition Calert has been satisfied, and therefore does not perform the warning.

Thereafter, when the right door 100R is opened while the moving body 200 is moving in the right rear warning area A_RR toward the right door 100R, the alighting support device 10 determines that the first warning condition Calert_1 has been satisfied and performs warning in a first mode to the occupant of the own vehicle 100.

The warning in the first mode is warning in a mode in which the level of possibility (warning level Lalert) that causes the occupant of the own vehicle 100 to notice the presence of the moving body 200 having a possibility to come into contact with the door 100D is a predetermined level Lalert_th. Further, warning in a second mode described later is warning in a mode in which the warning level Lalert is lower than the predetermined level Lalert_th.

The warning level Lalert changes, for example, depending on the combination of:
(1) whether the warning is performed by the warning sound device 21;
(2) volume of the warning sound when the warning is performed by the warning sound device 21;
(3) warning sound generation time when the warning is performed by the warning sound device 21; (4) warning sound generation cycle when the warning is performed by the warning sound device 21; (5) whether the warning is performed by the audio device 22;
(6) volume of the warning voice when the warning is performed by the audio device 22; and
(7) whether the warning is performed by the image display device 23.

The warning sound generation time is a time during which the warning sound that has started to be generated continues, and the warning sound generation cycle is a time from a timing when the warning sound that has started to be generated is temporarily stopped to a timing when the next warning sound is started to be generated.

For example, generally speaking, the warning level Lalert is lower when only one of the warning by the warning sound device 21 and the warning by the audio device 22 is performed than when both the warning by the warning sound device 21 and the warning by the audio device 22 are performed. Further, the warning level Lalert is lower when the volume is low than when the volume is high.

In the present example, the warning in the first mode is the warning by the warning sound device 21 at a predetermined volume, the warning by the audio device 22 at a predetermined volume, and the warning by the image display device 23. The warning in the second mode is the warning by the warning sound device 21 at a predetermined volume.

On the other hand, the alighting support device 10 detects that the moving body 200 has entered the left rear warning area A_LR based on the peripheral information Isur. At this time, when both the left front door 100LF and the left rear door 100LR are closed, the alighting support device 10 does not perform the warning.

Thereafter, when the left door 100L is opened while the moving body 200 is moving in the left rear warning area A_LR toward the left door 100L, the alighting support device 10 determines that the first warning condition Calert_1 has been satisfied and performs the warning in the first mode to the occupant of the own vehicle 100.

Case of Performing Warning in Second Mode

On the other hand, when the right door 100R is already open at the timing when the moving body 200 enters the right rear warning area A_RR, the alighting support device 10 determines that the second warning condition Calert_2 has been satisfied and performs the warning in the second mode to the occupant of the own vehicle 100.

When the left door 100L is already open at the timing when the moving body 200 enters the left rear warning area A_LR, the alighting support device 10 determines that the second warning condition Calert_2 has been satisfied and performs the warning in the second mode to the occupant of the own vehicle 100.

As described above, in the case where the alighting support device 10 according to the second embodiment includes a plurality of warning units such as the warning sound device 21, the audio device 22, and the image display device 23, the alighting support device 10 according to the second embodiment performs the warning in the first mode, in which all the warning units are used, when the first warning condition Calert_1 is satisfied, and performs the warning in the second mode, in which part of the waning units is used, when the second warning condition Calert_2 is satisfied.

Effects

As described above, when the right door 100R is opened before the moving body 200 enters the right rear warning area A_RR and then the moving body 200 enters the right rear warning area A_RR, the alighting support device 10 according to the second embodiment performs the warning in the second mode in which the warning level Lalert is low. That is, when the door 100D is in the open state before the moving body 200 enters the warning area A and it is easy for the driver of the moving body 200 or the pedestrian to take an action to avoid contact with the door 100D, the warning in which the warning level Lalert is low is performed.

On the other hand, when the door 100D is opened after the moving body 200 enters the warning area A and it is difficult for the driver of the moving body 200 or the pedestrian to take an action to avoid contact with the door 100D, the warning in the first mode in which the warning level Lalert is high is performed.

In this way, warning with higher warning level Lalert is performed when it is difficult for the driver of the moving body 200 or the pedestrian to take an action to avoid contact with the door 100D than when it is easy for the driver of the moving body 200 or the pedestrian to take an action to avoid contact with the door 100D. Therefore, it is possible to increase the possibility that the occupant of the own vehicle 100 notices the presence of the moving body 200 having a possibility to come into contact with the door 100D when it is difficult for the driver of the moving body 200 or the pedestrian to take an action to avoid contact with the door 100D. Thus, it is possible to suppress unnecessary warning. As a result, the occupant is prompted to stop the action of opening the door 100D or start the action of closing the door 100D. Thus, it is possible to restrain the moving body 200 from coming into contact with the door 100D.

End of Warning

After the warning is started, when the warning end condition Cter that the door 100D that is the target of the warning is closed or the moving body 200 that is the target of the warning has exited the warning area A is satisfied, the alighting support device 10 ends the warning.

Specific Operations of Alighting Support Device According to Second Embodiment

Figure 7:
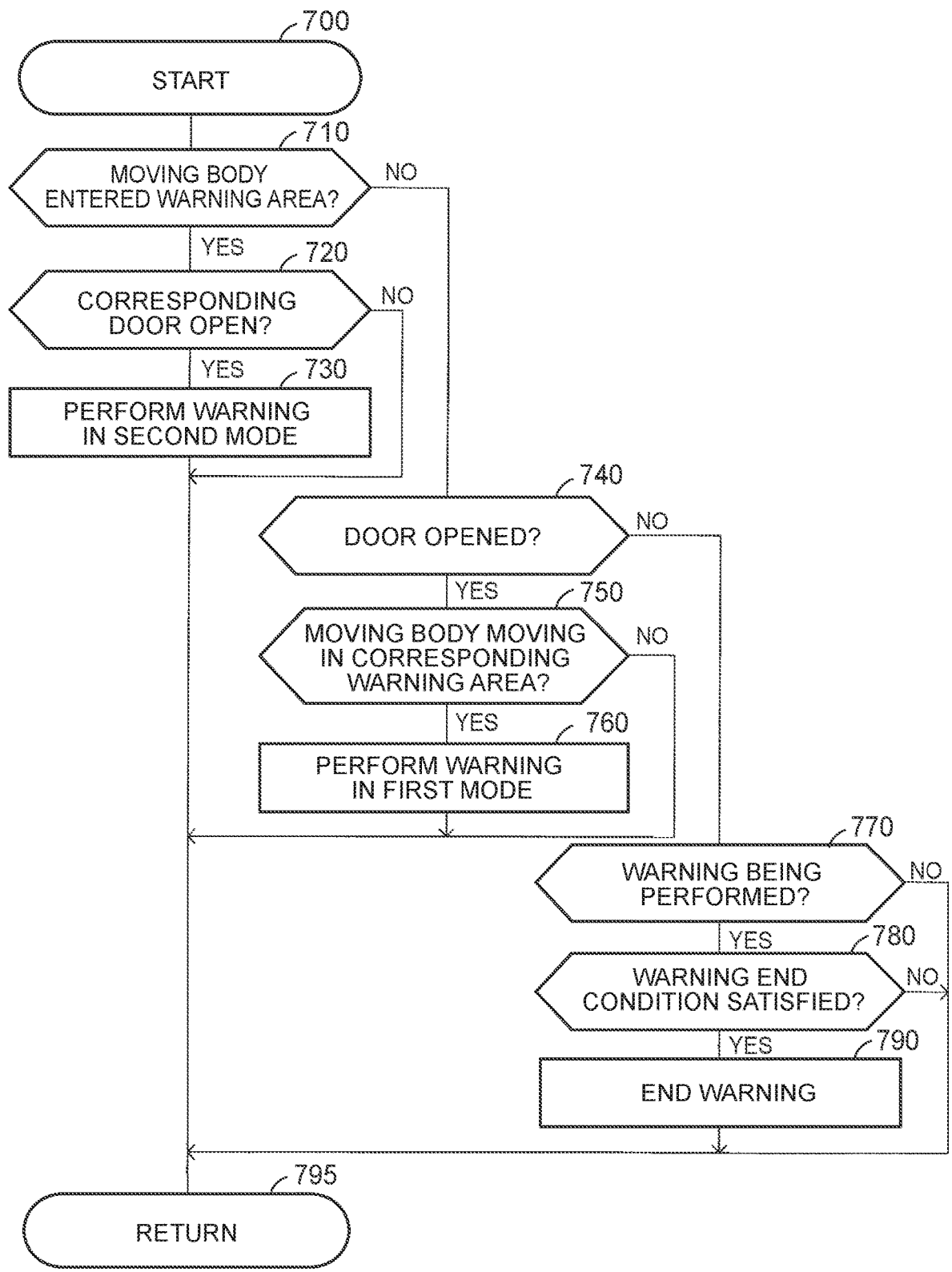
FIG. 7 is a flowchart showing a routine executed by the alighting support device according to a second embodiment of the present disclosure.

The CPU of the ECU 90 of the alighting support device 10 according to the second embodiment executes the routine shown in FIG. 7 every time a predetermined time elapses. Therefore, at a predetermined timing, the CPU starts the process from step 700 in FIG. 7, proceeds with the process to step 710, and determines whether the moving body 200 has entered the warning area A.

When the CPU determines "Yes" in step 710, the CPU proceeds with the process to step 720, and determines whether the door 100D corresponding to the warning area A that the moving body 200 has entered is open.

When the CPU determines "Yes" in step 720, the CPU proceeds with the process to step 730 and performs the warning in the second mode. Thereafter, the CPU proceeds to step 795 and temporarily ends the routine.

On the other hand, when the CPU determines "No" in step 720, the CPU directly proceeds with the process to step 795 and temporarily ends the routine.

When the CPU determines "No" in step 710, the CPU proceeds with the process to step 740 and determines whether the door 100D is opened.

When the CPU determines "Yes" in step 740, the CPU proceeds with the process to step 750, and determines whether the moving body 200 is moving in the warning area A corresponding to the opened door 100D toward the door 100D.

When the CPU determines "Yes" in step 750, the CPU proceeds with the process to step 760 and performs the warning in the first mode. Thereafter, the CPU proceeds with the process to step 795 and temporarily ends the routine.

On the other hand, when the CPU determines "No" in step 750, the CPU directly proceeds with the process to step 795 and temporarily ends the routine.

When the CPU determines "No" in step 740, the CPU proceeds with the process to step 770 and determines whether the warning is being performed.

When the CPU determines "Yes" in step 770, the CPU proceeds with the process to step 780, and determines whether the warning end condition Cter that the door 100D that is the target of the warning is closed or the moving body 200 that is the target of the warning has exited the warning area A is satisfied.

When the CPU determines "Yes" in step 780, the CPU proceeds with the process to step 790 and ends the warning being performed. Thereafter, the CPU proceeds with the process to step 795 and temporarily ends the routine.

On the other hand, when the CPU determines "No" in step 770 or step 780, the CPU directly proceeds with the process to step 795 and temporarily ends the routine.

The specific operations of the alighting support device 10 according to the second embodiment have been described above.

The present disclosure is not limited to the above embodiments, and it is possible to employ various modifications within the scope of the disclosure.

First Modification

For example, the occupant of the own vehicle 100 may widely open the door 100D, which has been once opened small. The driver of the moving body 200 or the pedestrian easily notices the door 100D that is opened wide, but does not easily notice the door 100D that is opened small. Thus, when the moving body 200 enters the warning area A and the door 100D corresponding to the warning area A is opened only small, there is a possibility that the driver of the moving body 200 or the pedestrian does not notice that the door 100D is open and as a result, continues approaching the door 100D without taking an action to avoid contact with the door 100D. At this time, if the occupant of the own vehicle 100 does not notice that the moving body 200 is approaching the door 100D and opens the door 100D further, the moving body 200 may fail to avoid the door 100D and come into contact with the door 100D.

Therefore, as a first modification of the embodiment of the present disclosure, the alighting support device 10 may be configured to consider that the door 100D is closed, when the door 100D is opened to a degree less than a predetermined degree Dth.

In the present example, the predetermined degree Dth is a predetermined pivot angle θswing_th when the door 100D is a swing door, and the predetermined degree Dth is a predetermined sliding distance Lslide_th when the door 100D is a sliding door. The predetermined pivot angle θswing_th and the predetermined sliding distance Lslide_th are set to the minimum pivot angle θswing_min and the minimum sliding distance Lslide min that allow the driver of the moving body 200 and the pedestrian to recognize that the door 100D is open. However, the predetermined pivot angle θswing_th may be set to an angle larger than the minimum pivot angle θswing_min or an angle smaller than the minimum pivot angle θswing_min, and the predetermined sliding distance Lslide_th may be set to a distance longer than the minimum sliding distance Lslide min or a distance shorter than the minimum sliding distance Lslide min.

Suppose the alighting support device 10 according to the first embodiment is configured according to the first modification. When the right doors 100R are both closed at the timing when the moving body 200 enters the right rear warning area A_RR, the alighting support device 10 does not determine that the warning condition Calert is satisfied, and therefore does not perform the warning. When either of the right doors 100R is open at the timing when the moving body 200 enters the right rear warning area A_RR but the right door 100R is open to a degree less than the predetermined degree Dth, the alighting support device 10 considers that the right door 100R is closed and does not determine that the warning condition Calert is satisfied, and therefore does not perform the warning.

Then, when the right door 100R that was closed while the moving body 200 was moving in the right rear warning area A_RR toward the right door 100R is opened, the alighting support device 10 determines that the warning condition Calert has been satisfied and performs the warning. When the right door 100R that was open to the degree less than the predetermined degree Dth while the moving body 200 was moving in the right rear warning area A_RR toward the right door 100R starts to be opened further, the alighting support device 10 considers that the right door 100R that was closed is opened and determines that the warning condition Calert has been satisfied, and performs the warning.

When the moving body 200 enters the right rear warning area A_RR with the right door 100R being opened to the predetermined degree Dth or more, the alighting support device 10 does not determine that the warning condition Calert is satisfied, and therefore does not perform the warning.

The same applies to whether to perform the warning for the moving body 200 that enters the left rear warning area A_LR.

According to this, when the door 100D, which was open small while the moving body 200 was moving in the warning area A toward the door 100D, starts to be opened, the warning is performed. Therefore, the occupant of the own vehicle 100 can notice the presence of the moving body 200 having a possibility to come into contact with the door 100D.

Alternatively, suppose the alighting support device 10 according to the second embodiment is configured according to the first modification. When the right doors 100R are both closed at the timing when the moving body 200 enters the right rear warning area A_RR, the alighting support device 10 does not determine that the first warning condition Calert_1 is satisfied nor the second warning condition Calert_2 is satisfied, and therefore does not perform the warning. When either of the right doors 100R is open at the timing when the moving body 200 enters the right rear warning area A_RR but the right door 100R is open to a degree less than the predetermined degree Dth, the alighting support device 10 considers that the right door 100R is closed and does not determine that the first warning condition Calert_1 is satisfied nor the second warning condition Calert_2 is satisfied, and therefore does not perform the warning.

Then, when the right door 100R that was closed while the moving body 200 was moving in the right rear warning area A_RR toward the right door 100R is opened, the alighting support device 10 determines that the first warning condition Calert_1 has been satisfied and performs the warning in the first mode. When the right door 100R that was open to the degree less than the predetermined degree Dth while the moving body 200 was moving in the right rear warning area A_RR toward the right door 100R starts to be opened further, the alighting support device 10 considers that the right door 100R that was closed is opened and determines that the first warning condition Calert_1 has been satisfied, and performs the warning in the first mode.

When the moving body 200 enters the right rear warning area A_RR with the right door 100R being open to the predetermined degree Dth or more, the alighting support device 10 determines that the second warning condition Calert_2 has been satisfied, and performs the warning in the second mode.

The same applies to whether to perform the warning for the moving body 200 that enters the left rear warning area A_LR.

According to this, when the door 100D, which was open small while the moving body 200 was moving in the warning area A toward the door 100D, starts to be opened, the warning in the first mode is performed. Therefore, the occupant of the own vehicle 100 can notice the presence of the moving body 200 having a possibility to come into contact with the door 100D.

Second Modification

Suppose the warning is not performed because the door 100D has been opened before the moving body 200 enters the warning area A. Even in this case, when the moving body 200 keeps moving in the warning area A toward the door 100D and comes very close to the door 100D, it can be determined that the moving body 200 may come into contact with the door 100D. Therefore, it may be desirable to perform the warning to indicate the presence of the moving body 200 having a possibility to come into contact with the door 100D.

Thus, as the second modification of the embodiment of the present disclosure, the alighting support device 10 may be configured such that, when the moving body 200 enters the warning area A but the alighting support device 10 determines that the warning condition Calert is not satisfied because the door 100D corresponding to the warning area A is open, and thereafter the moving body 200 keeps moving in the warning area A toward the door 100D, and the distance between the moving body 200 and the door 100D (target relative distance Drel) is shortened to a predetermined distance Drel_th, the alighting support device 10 determines that the warning condition Calert has been satisfied and performs the warning.

In the present example, the predetermined distance Drel_th may be a fixed distance regardless of the moving speed V2 of the moving body 200, or may be set to a longer distance as the moving speed V2 of the moving body 200 is higher.

For example, suppose the alighting support device 10 according to the first embodiment is configured according to the second modification. When the right door 100R is open at the timing when the moving body 200 enters the right rear warning area A_RR, the alighting support device 10 does not determine that the warning condition Calert is satisfied, and therefore does not perform the warning. After that, however, when the moving body 200 keeps moving in the right rear warning area A_RR toward the right door 100R, and the distance between the moving body 200 and the right door 100R (target relative distance Drel) is shortened to the predetermined distance Drel_th with the right door 100R being kept open, the alighting support device 10 determines that the warning condition Calert has been satisfied and performs the warning.

The same applies to whether to perform the warning for the moving body 200 that enters the left rear warning area A_LR.

Also suppose the alighting support device 10 according to the second embodiment is configured according to the second modification. When the right door 100R is open to the predetermined degree Dth or more at the timing when the moving body 200 enters the right rear warning area A_RR, the alighting support device 10 determines that the second warning condition Calert_2 has been satisfied, and performs the warning in the second mode. After that, when the moving body 200 keeps moving in the right rear warning area A_RR toward the right door 100R, and the right door 100R is open to the predetermined degree Dth or more at the timing when the distance between the moving body 200 and the right door 100R (target relative distance Drel) is shortened to the predetermined distance Drel_th with the right door 100R being kept open to the predetermined degree Dth or more, the alighting support device 10 determines that the first warning condition Calert_1 has been satisfied, and performs the warning in the first mode.

The same applies to whether to perform the warning for the moving body 200 that enters the left rear warning area A_LR.

Third Modification

The possibility that the moving body 200 comes into contact with the door 100D is higher when the distance between the moving body 200 moving in the warning area A toward the door 100D and the door 100D (target relative distance Drel) is short than when the distance is long. Therefore, in the case where the door 100D starts to be opened while the moving body 200 is moving in the warning area A toward the door 100D that is closed or open to a degree less than the predetermined degree Dth, it is desired that the occupant of the own vehicle 100 more surely notice the presence of the moving body 200 having a possibility to come into contact with the door 100D when the target relative distance Drel at that time is short than when the target relative distance Drel is long.

Therefore, as a third modification of the embodiment of the present disclosure, the alighting support device 10 may be configured such that in the case where the door 100D starts to be opened while the moving body 200 is moving in the warning area A toward the door 100D that is closed or open to a degree less than the predetermined degree Dth, when the target relative distance Drel at that time is equal to or more than the predetermined distance Drel_th, the alighting support device 10 determines that the second warning condition Calert_2 has been satisfied, and performs the warning in the second mode, whereas when the target relative distance Drel at that time is shorter than the predetermined distance Drel_th, the alighting support device 10 determines that the first warning condition Calert_1 has been satisfied, and performs the warning in the first mode.

Further, as the third modification of the embodiment of the present disclosure, the alighting support device 10 may be configured such that in the case where the door 100D starts to be opened while the moving body 200 is moving in the warning area A toward the door 100D that is closed or open to a degree less than the predetermined degree Dth, when the alighting support device 10 determines that the second warning condition Calert_2 has been satisfied and starts the warning in the second mode based on the fact that the target relative distance Drel at that time is equal to or more than the predetermined distance Drel_th, and thereafter the relative distance Drel becomes shorter than the predetermined distance Drel_th with the warning end condition Cter being not satisfied, the alighting support device 10 determines that the first warning condition Calert_1 has been satisfied, and performs the warning in the first mode.

For example, suppose the alighting support device 10 according to the first embodiment is configured according to the third modification. In the case where the right door 100R is opened while the moving body 200 is moving in the right rear warning area A_RR toward the right door 100R, when the target relative distance Drel at that time is equal to or more than the predetermined distance Drel_th, the alighting support device 10 determines that the second warning condition Calert_2 has been satisfied and performs the warning in the second mode, whereas when the target relative distance Drel at that time is shorter than the predetermined distance Drel_th, the alighting support device 10 determines that the first warning condition Calert_1 has been satisfied and performs the warning in the first mode.

Further, in the case where the right door 100R is opened while the moving body 200 is moving in the right rear warning area A_RR toward the right door 100R, when the alighting support device 10 determines that the second warning condition Calert_2 has been satisfied and starts the warning in the second mode based on the fact that the target relative distance Drel at that time is equal to or more than the predetermined distance Drel_th, and thereafter the relative distance Drel becomes shorter than the predetermined distance Drel_th, with the right door 100R being kept open (that is, with the warning end condition Cter being not satisfied), the alighting support device 10 determines that the first warning condition Calert_1 has been satisfied, and performs the warning in the first mode.

The same applies to whether to perform the warning for the moving body 200 that enters the left rear warning area A_LR.

Also suppose the alighting support device 10 according to the second embodiment is configured according to the third modification. In the case where the right door 100R starts to be opened while the moving body 200 is moving in the right rear warning area A_RR toward the right door 100R that is closed or open to a degree less than the predetermined degree Dth, when the target relative distance Drel at that time is equal to or more than the predetermined distance Drel_th, the alighting support device 10 determines that the second warning condition Calert_2 has been satisfied and performs the warning in the second mode, whereas when the target relative distance Drel at that time is shorter than the predetermined distance Drel_th, the alighting support device 10 determines that the first warning condition Calert_1 has been satisfied and performs the warning in the first mode.

Further, in the case where the right door 100R starts to be opened while the moving body 200 is moving in the right rear warning area A_RR toward the right door 100R that is closed or open to a degree less than the predetermined degree Dth, when the alighting support device 10 determines that the second warning condition Calert_2 has been satisfied and starts the warning in the second mode based on the fact that the target relative distance Drel at that time is equal to or more than the predetermined distance Drel_th, and thereafter the relative distance Drel becomes shorter than the predetermined distance Drel_th, with the right door 100R being kept open to the predetermined degree Dth or more (that is, with the warning end condition Cter being not satisfied), the alighting support device 10 determines that the first warning condition Calert_1 has been satisfied, and performs the warning in the first mode.

The same applies to whether to perform the warning for the moving body 200 that enters the left rear warning area A_LR.

Fourth Modification

Further, when the occupant operates the door lock operation device 33 to unlock the door 100D, it can be estimated that the occupant is about to open the door 100D. When the moving body 200 may come into contact with the door 100D if the occupant opens the unlocked door 100D, it is desirable to cause the occupant to notice the presence of the moving body 200 having a possibility to come into contact with the door 100D.

Thus, as the fourth modification of the embodiment of the present disclosure, the alighting support device 10 may be configured such that when the operation of unlocking the door 100D is performed on the door lock operation device 33 before the moving body 200 enters the warning area A, the alighting support device 10 does not consider that the door 100D is opened, but when the operation of unlocking the door 100D is performed on the door lock operation device 33 while the moving body 200 is moving in the warning area A toward the door 100D, the alighting support device 10 considers that the door 100D is opened.

For example, suppose the alighting support device 10 according to the first embodiment is configured according to the fourth modification. When the operation of unlocking the right door 100R is performed on the door lock operation device 33 while the moving body 200 is moving in the right rear warning area A_RR toward the right door 100R, the alighting support device 10 determines that the warning condition Calert has been satisfied and performs the warning.

The same applies to whether to perform the warning for the moving body 200 that enters the left rear warning area A_LR.

Also suppose the alighting support device 10 according to the second embodiment is configured according to the fourth modification. When the operation of unlocking the right door 100R is performed on the door lock operation device 33 while the moving body 200 is moving in the right rear warning area A_RR toward the right door 100R, the alighting support device 10 determines that the first warning condition Calert_1 has been satisfied and performs the warning in the first mode.

The same applies to whether to perform the warning for the moving body 200 that enters the left rear warning area A_LR.

Fifth Modification

Thus, as the fifth modification of the embodiment of the present disclosure, the alighting support device 10 may be configured such that when the operation of unlocking the door 100D is performed on the door lock operation device 33 while the moving body 200 is moving in the warning area A toward the door 100D, the alighting support device 10 does not consider that the door 100D is opened and determines that the second warning condition Calert_2 has been satisfied.

For example, suppose the alighting support device 10 according to the first embodiment or the second embodiment is configured according to the fifth modification. When the operation of unlocking the right door 100R is performed on the door lock operation device 33 while the moving body 200 is moving in the right rear warning area A_RR toward the right door 100R, the alighting support device 10 determines that the second warning condition Calert_2 has been satisfied and performs the warning in the second mode. Thereafter, when the right door 100R is opened, the alighting support device 10 determines that the first warning condition Calert_1 has been satisfied and performs the warning in the first mode.

The same applies to whether to perform the warning for the moving body 200 that enters the left rear warning area A_LR.

Sixth Modification

Figure 8:
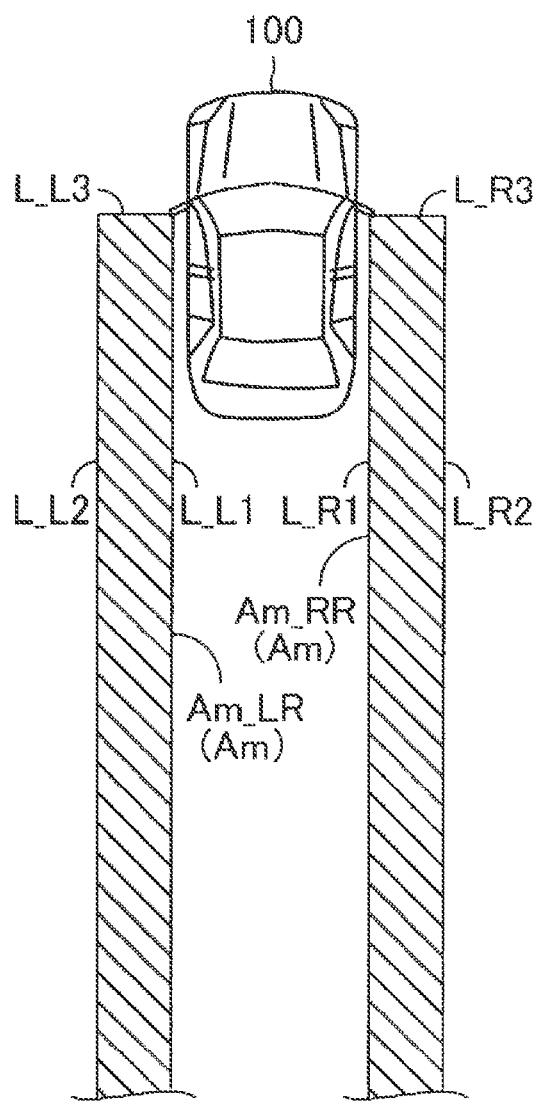
FIG. 8 is a diagram showing monitoring areas according to a sixth modification.

As a sixth modification of the embodiment of the present disclosure, a monitoring area Am is set as shown in FIG. 8 instead of the warning area A, and the alighting support device 10 may be configured such that when a predicted arrival time TTC for the moving body 200 becomes a predetermined time TTCth or less (that is, the predicted arrival time TTC is shortened to the predetermined time TTCth) while the moving body 200 is moving in the monitoring area Am toward the door 100D, the alighting support device 10 determines that the moving body 200 has entered the warning area A.

The predicted arrival time TTC is a time predicted for the moving body 200 to reach the door 100D, and in the present example, the alighting support device 10 acquires the predicted arrival time TTC in accordance with the following equation (1).

$$TTC = Drel/V200 \quad (1)$$

In the above equation (1), "Drel" is the distance between the moving body 200 and each door 100D, and "V200" is the moving speed of the moving body 200.

The predetermined time TTCth is set to the minimum required time required for the moving body 200 moving in the monitoring area Am toward the door 100D in the open state to exit the monitoring area Am in order to avoid the door 100D. The predetermined time TTCth may be set to a time longer than the minimum required time, or may be set to a time shorter than the minimum required time in some cases.

The monitoring area Am includes a right rear monitoring area Am_RR and a left rear monitoring area Am_LR. The right rear monitoring area Am_RR is an area surrounded by the right side wall surface line L_R1, the right side line L_R2, and the right front door line L_R3, and the left rear monitoring area Am_LR is an area surrounded by the left side wall surface line L_L1, the left side line L_L2, and the left front door line L_L3.

For example, suppose the alighting support device 10 according to the first embodiment is configured according to the sixth modification. When the predicted arrival time TTC for the moving body 200 is shortened to the predetermined time TTCth while the moving body 200 is moving in the right rear monitoring area Am_RR toward the right door 100R, the alighting support device 10 determines that the moving body 200 has entered the right rear warning area A_RR.

The same applies to the moving body 200 moving in the left rear monitoring area Am_LR.

Seventh Modification

Figure 9:
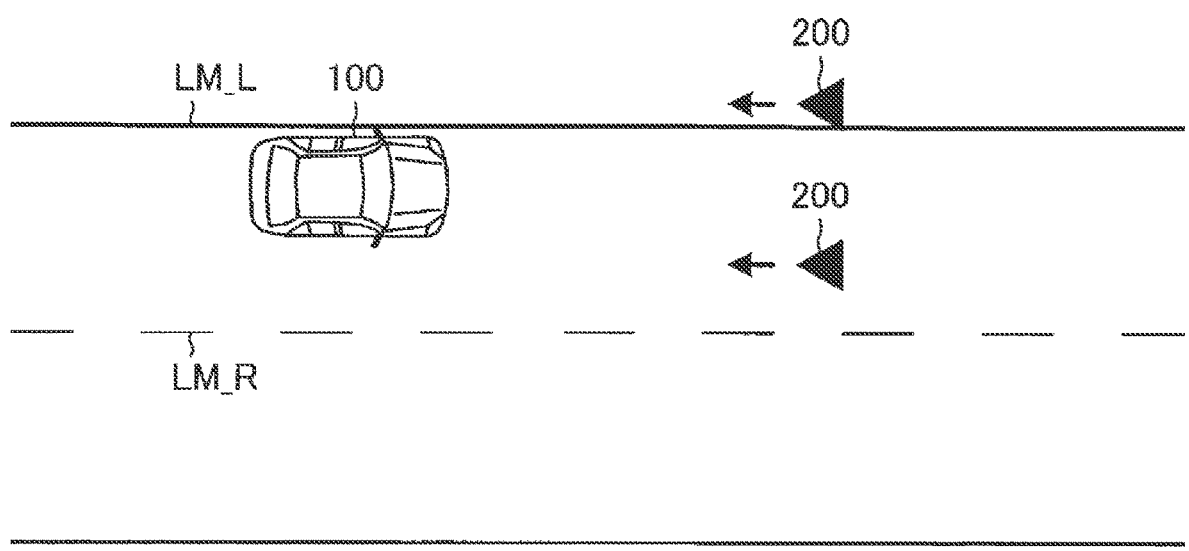
FIG. 9 is a diagram showing an example of a situation in which a moving body is approaching from the front of the vehicle.

Further, as shown in FIG. 9, the moving body 200 such as a bicycle or a pedestrian may approach the own vehicle 100 from the front.

Figure 10:
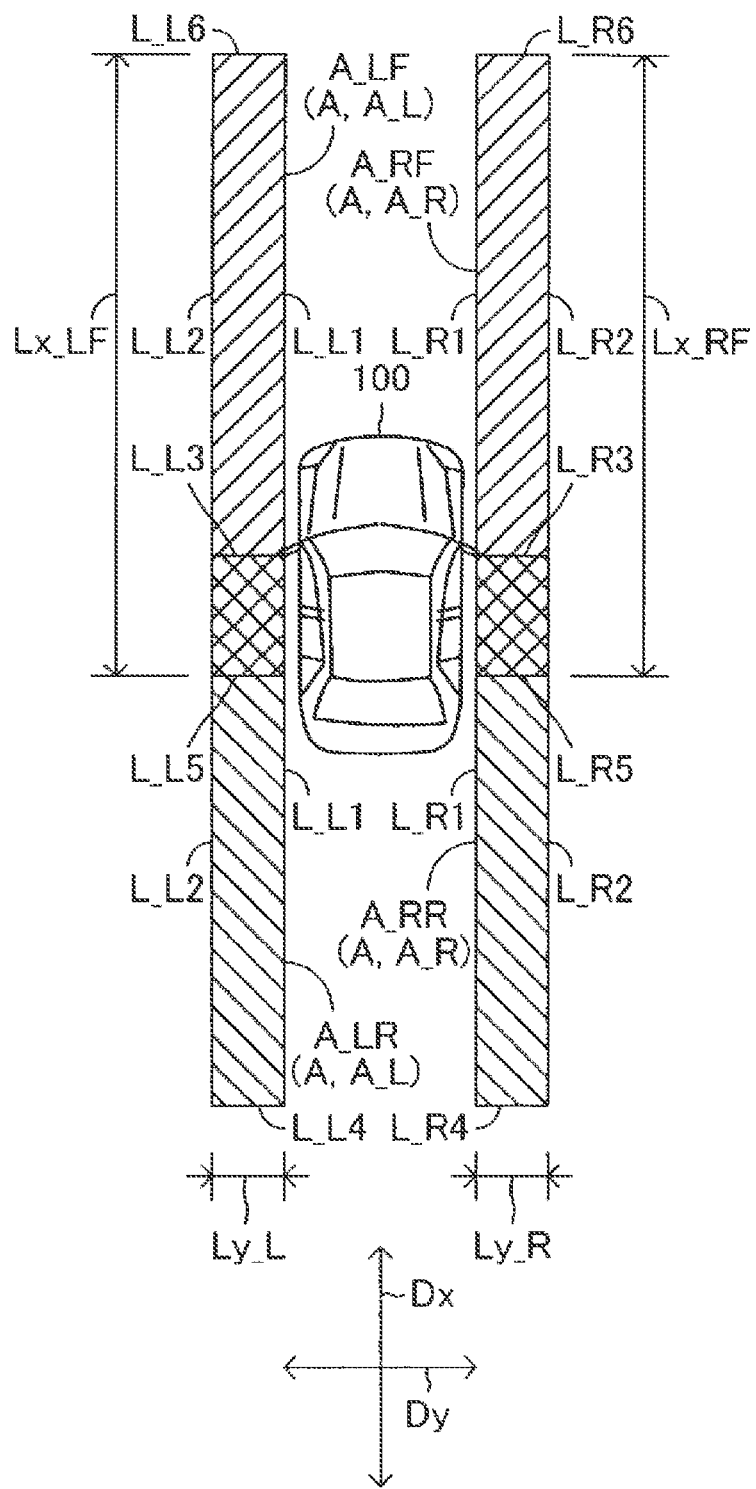
FIG. 10 is a diagram showing warning areas in the alighting support device according to a seventh modification of the embodiment of the present disclosure.

Thus, as a seventh modification of the embodiment of the present disclosure, the warning area A is set as shown in FIG. 10, and the alighting support device 10 may be configured to monitor not only the moving body 200 that enters the warning area A from the rear but also the moving body 200 that enters the warning area A from the front and perform the warning.

The warning area A shown in FIG. 10 includes an area on the right side of the own vehicle 100 (right warning area A_R) and an area on the left side of the own vehicle 100 (left warning area A_L). The right warning area A_R includes a right front warning area A_RF and a right rear warning area A_RR, and the left warning area A_L includes a left front warning area A_LF and a left rear warning area A_LR.

Right Warning Area

The right rear warning area A_RR is the right rear warning area A_RR described above. The right front warning area A_RF is an area defined by a right side wall surface line L_R1, a right side line L_R2, a right rear door line L_R5, and a right front line L_R6.

The right side wall surface line L_R1 and the right side line L_R2 are the right side wall surface line L_R1 and the right side line L_R2 described above, respectively. The right rear door line L_R5 is a line extending in the lateral direction Dy of the own vehicle 100 through the rear end portion of the right rear door 100RR. The right front line L_R6 is a line extending in the lateral direction Dy of the own vehicle 100 in parallel with the right rear door line L_R5 and spaced away to the front from the right rear door line L_R5 by a predetermined distance (predetermined right front length Lx_RF).

In the present example, the predetermined right front length Lx_RF is set to a minimum required length required for the moving body 200 moving in the right front warning area A_RF toward the right door 100R in the open state to exit the right front warning area A_RF in order to avoid the right door 100R. Therefore, in the present example, the predetermined right front length Lx_RF is set to be longer as the moving speed V2 of the moving body 200 is higher. The predetermined right front length Lx_RF may be set to a length longer than the minimum required length, or may be set to a length shorter than the minimum required length in some cases. Also in these cases, the predetermined right front length Lx_RF is set in accordance with the moving speed V2 of the moving body 200. However, the predetermined right front length Lx_RF may be set to a fixed distance.

Left Warning Area

The left rear warning area A_LR of the left warning area A_L is the left rear warning area A_LR described above. The left front warning area A_LF of the left warning area A_L is an area defined by a left side wall surface line L_L1, a left side line L_L2, a left rear door line L_L5, and a left front line L_L6.

The left side wall surface line L_L1 and the left side line L_L2 are the left side wall surface line L_L1 and the left side line L_L2 described above, respectively. The left rear door line L_L5 is a line extending in the lateral direction Dy of the own vehicle 100 through the rear end portion of the left rear door 100LR. The left front line L_L6 is a line extending in the lateral direction Dy of the own vehicle 100 in parallel with the left front door line L_L3 and spaced away to the front from the left rear door line L_L5 by a predetermined distance (predetermined left front length Lx_LF).

In the present example, the predetermined left front length Lx_LF is set to a minimum required length required for the moving body 200 moving in the left front warning area A_LF toward the left door 100L in the open state to exit the left front warning area A_LF in order to avoid the left door 100L. Therefore, in the present example, the predetermined left front length Lx_LF is set to be longer as the moving speed V2 of the moving body 200 is higher. The predetermined left front length Lx_LF may be set to a length longer than the minimum required length, or may be set to a length shorter than the minimum required length in some cases. Also in these cases, the predetermined left front length Lx_LF is set in accordance with the moving speed V2 of the moving body 200. However, the predetermined left front length Lx_LF may be set to a fixed distance.

The predetermined right front length Lx_RF and the predetermined left front length Lx_LF may have the same length or different lengths from each other.

For example, suppose the alighting support device 10 according to the first embodiment is configured according to the seventh modification. When the right doors 100R are both closed at the timing when the moving body 200 enters the right rear warning area A_RR, the alighting support device 10 does not determine that the warning condition Calert is satisfied, and therefore does not perform the warning. Also, when the right doors 100R are both closed at the timing when the moving body 200 enters the right front warning area A_RF, the alighting support device 10 does not determine that the warning condition Calert is satisfied, and therefore does not perform the warning.

Then, when the right door 100R that was closed while the moving body 200 was moving in the right rear warning area A_RR toward the right door 100R is opened, the alighting support device 10 determines that the warning condition Calert has been satisfied and performs the warning. When the right door 100R that was closed while the moving body 200 was moving in the right front warning area A_RF toward the right door 100R is opened, the alighting support device 10 determines that the warning condition Calert has been satisfied and performs the warning.

The same applies to whether to perform the warning for the moving body 200 that enters the left rear warning area A_LR.

Also suppose the alighting support device 10 according to the second embodiment is configured according to the seventh modification. When the right doors 100R are both closed at the timing when the moving body 200 enters the right rear warning area A_RR, the alighting support device 10 does not determine that the warning condition Calert is satisfied, and therefore does not perform the warning. Also, when the right doors 100R are both closed at the timing when the moving body 200 enters the right front warning area A_RF, the alighting support device 10 does not determine that the warning condition Calert is satisfied, and therefore does not perform the warning.

Then, when the right door 100R that was closed while the moving body 200 was moving in the right rear warning area A_RR toward the right door 100R is opened, the alighting support device 10 determines that the first warning condition Calert_1 has been satisfied and performs the warning in the first mode. Also, when the right door 100R that was closed while the moving body 200 was moving in the right front warning area A_RF toward the right door 100R is opened, the alighting support device 10 determines that the first warning condition Calert_1 has been satisfied and performs the warning in the first mode.

When the right door 100R is in the open state at the timing when the moving body 200 enters the right rear warning area A_RR, the alighting support device 10 determines that the second warning condition Calert_2 has been satisfied and performs the warning in the second mode. Also, when the right door 100R is in the open state at the timing when the moving body 200 enters the right front warning area A_RF, the alighting support device 10 determines that the second warning condition Calert_2 has been satisfied and performs the warning in the second mode.

The same applies to whether to perform the warning for the moving body 200 that enters the left front warning area A_LF.

Eighth Modification

When a person opens the door 100D in order to get into the own vehicle 100, the driver of the moving body 200 and the pedestrian are likely to recognize the person getting into the own vehicle 100 and take an action to avoid contact with the person and the door 100D. Therefore, when a person opens the door 100D in order to get into the own vehicle 100, there is little need to perform the warning.

Thus, as an eighth modification of the embodiment of the present disclosure, the alighting support device 10 may be configured such that when the occupant opens the door 100D in order to get off the own vehicle 100 while the moving body 200 is moving in the warning area A toward the door 100D, the alighting support device 10 performs the warning, whereas when the person opens the door 100D in order to get into the own vehicle 100 while the moving body 200 is moving in the warning area A toward the door 100D, the alighting support device 10 does not perform the warning.

For example, suppose the alighting support device 10 according to the first embodiment is configured according to the eighth modification. When the occupant opens the right door 100R in order to get off the own vehicle 100 while the moving body 200 is moving in the right rear warning area A_RR toward the right door 100R, the alighting support device 10 determines that the warning condition Calert has been satisfied and performs the warning. When the person opens the right door 100R in order to get into the own vehicle 100 while the moving body 200 is moving in the right rear warning area A_RR toward the right door 100R, the alighting support device 10 does not determine that the warning condition Calert is satisfied and performs the warning.

The same applies to whether to perform the warning for the moving body 200 that enters the left rear warning area A_LR.

Also suppose the alighting support device 10 according to the second embodiment is configured according to the eighth modification. When the occupant opens the right door 100R in order to get off the own vehicle 100 while the moving body 200 is moving in the right rear warning area A_RR toward the right door 100R, the alighting support device 10 determines that the first warning condition Calert_1 has been satisfied and performs the warning in the first mode. When the person opens the right door 100R in order to get into the own vehicle 100 while the moving body 200 is moving in the right rear warning area A_RR toward the right door 100R, the alighting support device 10 does not determine that the first warning condition Calert_1 is satisfied nor the second warning condition Calert_2 is satisfied, and therefore does not perform the warning.

The same applies to whether to perform the warning for the moving body 200 that enters the left rear warning area A_LR.

Ninth Modification

Even when the occupant of the own vehicle 100 notices that the moving body 200 is approaching the door 100D by the warning, the moving body 200 may end up in coming into contact with the door 100D if the timing of stopping opening the door 100D is late or the timing of closing the door 100D is late.

Thus, as a ninth modification of the embodiment of the present disclosure, the alighting support device 10 may be configured such that when performing the warning, the alighting support device 10 locks the door 100D in conjunction with the warning so that the door 100D that is the target of the warning does not open any more.

What is claimed is:

1. An alighting support device comprising a control unit that performs warning to notify an occupant of a vehicle of presence of a moving body approaching the vehicle and having a possibility to come into contact with a right door or a left door of the vehicle, wherein the control unit is configured such that when the control unit determines that a predetermined warning condition is satisfied, the control unit performs the warning, when the control unit determines that the warning condition is not satisfied, the control unit does not perform the warning, when the right door is opened or is about to be opened while the moving body is moving in a right warning area extending on a right side of the vehicle along a front-rear direction of the vehicle in a vicinity of the vehicle, the control unit determines that the warning condition is satisfied, when the moving body enters the right warning area with the right door being open to a degree that is equal to or more than a predetermined degree set for the right door, the control unit determines that the warning condition is not satisfied, when the left door is opened or is about to be opened while the moving body is moving in a left warning area extending on a left side of the vehicle along the front-rear direction of the vehicle in the vicinity of the vehicle, the control unit determines that the warning condition is satisfied, when the moving body enters the left warning area with the left door being open to a degree that is equal to or more than a predetermined degree set for the left door, the control unit determines that the warning condition is not satisfied, wherein the predetermined degree set for the right door is set to a degree larger than zero, and wherein the predetermined degree set for the left door is set to a degree larger than zero.

2. The alighting support device according to claim 1, wherein:

the right warning area includes a right rear warning area extending rearward of the vehicle on the right side of the vehicle in the vicinity of the vehicle; and the left warning area includes a left rear warning area extending rearward of the vehicle on the left side of the vehicle in the vicinity of the vehicle.

3. The alighting support device according to claim 1, wherein:

the right warning area includes a right front warning area extending forward of the vehicle on the right side of the vehicle in the vicinity of the vehicle; and the left warning area includes a left front warning area extending forward of the vehicle on the left side of the vehicle in the vicinity of the vehicle.

* * * * *